US011885477B2

(12) United States Patent
Rashidi Doust

(10) Patent No.: US 11,885,477 B2
(45) Date of Patent: Jan. 30, 2024

(54) MULTI-COLORED RETROFIT LIGHT FIXTURE

(71) Applicant: ELITE LIGHTING, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 17/826,113

(22) Filed: May 26, 2022

(65) Prior Publication Data

US 2022/0282843 A1 Sep. 8, 2022

Related U.S. Application Data

(63) Continuation of application No. 17/013,398, filed on Sep. 4, 2020, now abandoned.

(60) Provisional application No. 62/896,463, filed on Sep. 5, 2019.

(51) Int. Cl.

| | |
|---|---|
| ***F21S 8/02*** | (2006.01) |
| ***F21V 23/04*** | (2006.01) |
| ***F21S 10/02*** | (2006.01) |
| ***F21Y 113/10*** | (2016.01) |
| ***F21Y 115/10*** | (2016.01) |
| ***F21Y 105/16*** | (2016.01) |

(52) U.S. Cl.

CPC ............. *F21S 8/026* (2013.01); *F21S 10/023* (2013.01); *F21V 23/04* (2013.01); *F21V 23/045* (2013.01); *F21Y 2105/16* (2016.08); *F21Y 2113/10* (2016.08); *F21Y 2115/10* (2016.08)

(58) Field of Classification Search

None

See application file for complete search history.

(56) References Cited

U.S. PATENT DOCUMENTS

| | | | | |
|---|---|---|---|---|
| 8,083,369 | B1 * | 12/2011 | Richardson | F21V 17/107 362/365 |
| 9,206,948 | B1 * | 12/2015 | Scribante | H05B 47/11 |
| 9,279,553 | B1 * | 3/2016 | Scribante | F21V 23/02 |
| 9,353,923 | B2 * | 5/2016 | Scribante | F21V 15/015 |
| 10,588,192 | B2 * | 3/2020 | Rashidi Doust | H05B 47/10 |
| 2013/0169187 | A1 * | 7/2013 | Lai | F21S 10/023 362/231 |

(Continued)

FOREIGN PATENT DOCUMENTS

CN 105258040 A * 1/2016

OTHER PUBLICATIONS

Zhicheng Chen, "Light-emitting diode (LED) color-changing recessed lamp", Jan. 20, 2016, Publication CN105258040A, EPO Translation Service, pp. 1-8 (Year: 2016).*

*Primary Examiner* — Alan B Cariaso
(74) *Attorney, Agent, or Firm* — Payam Moradian

(57) ABSTRACT

Provided is a light fixture retrofit kit comprising: a) a body with a first LED light source of a first color and a second LED light source of a second color; b) a switch for controlling one or more of wattage of the light sources and the color; c) a bracket for attaching the body to a pre-existing housing resting on a T-bar; wherein the fixture is placed in the pre-existing housing and pivotally attached to the T-bar with the bracket, wherein the user selects to power the first light source only, the second light source only, or both the first and the second light source to produce a blended color that is different than the first and the second color, and selects to power the light sources with different levels of power (watts).

1 Claim, 13 Drawing Sheets

(56) References Cited

U.S. PATENT DOCUMENTS

| | | | | |
|---|---|---|---|---|
| 2014/0232288 | A1* | 8/2014 | Brandes | H05B 45/48 315/250 |
| 2015/0267873 | A1* | 9/2015 | Price | F21K 9/27 362/432 |
| 2018/0206305 | A1* | 7/2018 | Van Winkle | F21S 8/026 |
| 2019/0318697 | A1* | 10/2019 | Kumar | H05B 47/11 |
| 2019/0338895 | A1* | 11/2019 | Jeswani | F21V 23/04 |
| 2022/0322506 | A1* | 10/2022 | Ray | F21K 9/278 |

* cited by examiner

MULTI-COLORED RETROFIT LIGHT FIXTURE

CROSS-REFERENCE

The present application claims the benefit of U.S. Provisional application No. 62/896,463, filed on Sep. 5, 2019, which is incorporated herein by reference.

BACKGROUND SECTION OF THE INVENTION

Pre-existing fluorescent lights are not as sufficient as LED lights. It is more cost efficient There is a need in the art to retrofit existing light fixtures to make them more efficient.

SUMMARY SECTION OF THE INVENTION

Provided is a light fixture comprising: a) a body; and b) one or more LED boards, each board having a plurality of first and a second colored LED light sources, the two colors configured to blend to form a third color; c) a switch configured to allow a user to choose between powering the first light source, the second light source or both, and for controlling the power delivered to the light sources; wherein the user has the option to power the first light source only, the second light source only, or both the first and the second light source to produce a blended color that is different than the first and the second color, and the option to power the light sources with different levels of power (watts).

Provided is a light fixture retrofit kit comprising: a) a body; b) a plurality of two or more differently colored LED (Light emitting Diode) light sources; c) a switch (can be two switches, one for the power consumption and one for the color) (the switch can be activated by an App on a smart device/phone, WiFi, Bluetooth, or other wireless protocol, or be a physical switch on the body) for adjusting/controlling power consumption/light output and for changing color (light color) of the colored LEDs, d) a bracket for attaching the body to a pre-existing housing; wherein a user has an option to choose to power the LED with a first color or the LED with a second color; and wherein a user can select at least two different levels of power (watts) to be delivered to the LED light sources.

A light fixture retrofit kit comprising: a body with a first LED light source of a first color and a second LED light source of a second color; a switch for controlling one or more of wattage of the light sources and the color; a bracket for attaching the body to a pre-existing housing resting on a T-bar; wherein the fixture is placed in the pre-existing housing and pivotally attached to the T-bar with the bracket, wherein the user selects to power the first light source only, the second light source only, or both the first and the second light source to produce a blended color that is different than the first and the second color, and selects to power the light sources with different levels of power (watts).

Provided is a method for retrofitting a troffer light fixture comprising attaching a bracket to a pre-existing housing, and pivotally attaching a new body having LED light sources to the bracket, the new body comprising at least two differently colored LED lights configured to be operated with different levels of power, and with a single or multiple colors.

The retrofit kit allows for replacing an existing fluorescent troffer body with a troffer body having LED light sources without removal of the troffer housing. In addition, the retrofit kit allows a user to both change the color and intensity of the lights.

Provided is a light fixture retrofit kit comprising a) a body with LE) light sources of at least two different colors configured to operate at two different wattage levels, b) a switch for controlling one or more of the wattage and the color, c) a bracket for attaching the body to a pre-existing housing resting on a T-bar; wherein the fixture is placed in the pre-existing housing and pivotally attached to the T-bar with the bracket; and wherein the user selects to power the first light source only, the second light source only, or both the first and the second light source to produce a blended color that is different than the first the second color, and selects to power the light sources with different levels of power (watts); wherein the body has one separate switch for controlling the color and one separate switch for controlling the color and one separate switch for controlling the wattage; wherein the light sources are placed on a LEI) board; wherein each LED board has differently colored lights; wherein the light fixture further comprises a curved lens below the LED boards; wherein the light fixture is configured to allow for adjusting the power delivered to the LED light source at two or more of the following wattage: 20, 30, or 40 watts; wherein the body has a hook and a member, the member configured to be pivotally attached to the bracket, and the hook configured to secure the body to the bracket.

The colored LED light sources can be selected from the two of: soft white (2700K-3000K), bright white/cool white (3500K-4100K), and daylight (5000K-6500K). A combination can be 3000 and 5000 Kelvin. The retrofit can be powered with only one colored light, or both colored lights to produce a blended light. The power to the lights of the fixture can also be adjusted. For example, the fixture can have a switch configured to power the LED lights with 20 Watts, 30 Watts, or 40 Watts (adjusting lumens of the fixture).

DETAILED SECTION OF THE INVENTION

Figure 1:
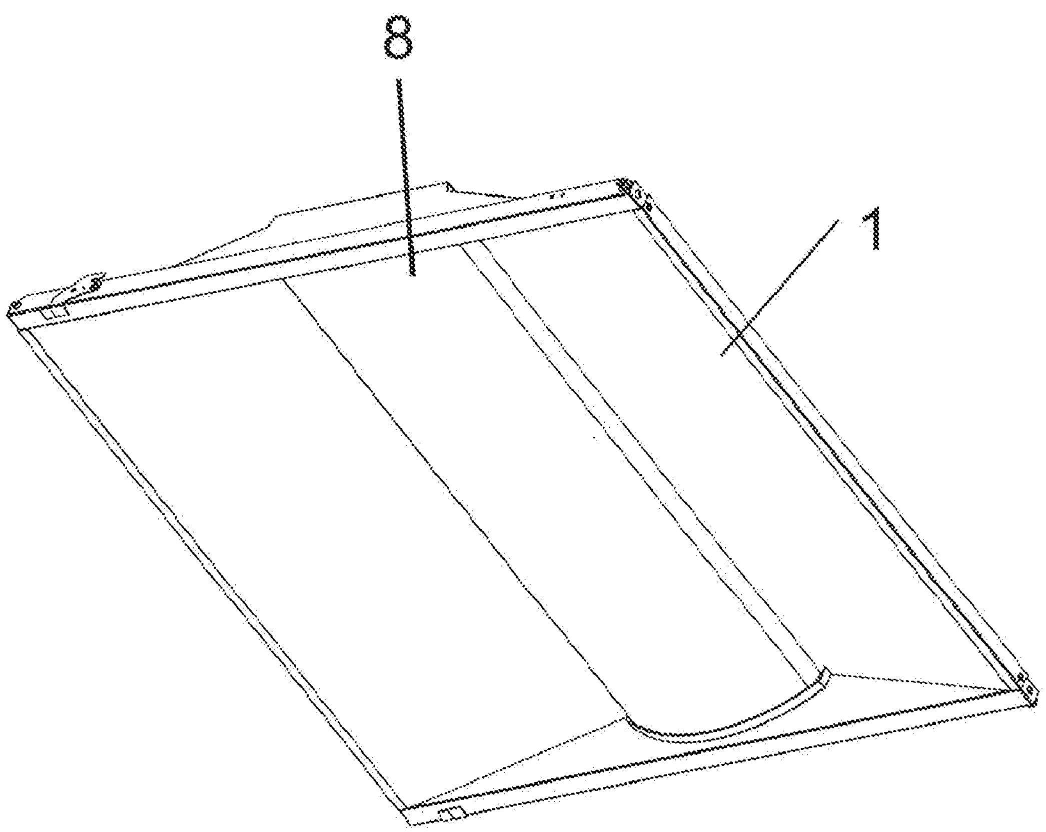
FIG. 1 illustrates a bottom perspective view of the body of the retrofit kit.

Provided is a light fixture retrofit kit that is configured to allow changing the body of an existing troffer housing, while leaving the existing troffer housing in place. The new body, which has LED sources of lights, is more efficient than the preexisting troffer body, and can lower the energy consumption (wattage), while at the same time increase the total light output (lumens). The retrofit kit also allows changing the temperature color (measured in Kelvin) emitted from the body while at the same time decreasing the power consumption. Rather than changing the electrical components of an existing body, a user can use the new body of the retrofit kit to lower power consumption, increase total light emitted, and also change the color emitted from the light sources. The retrofit kit also allows for having a wattage/power setting that is above that which is needed at the time of installation, which can be increased at a later point in time (such as 3-5 years after installation), to off-set the degradation of the LED's overtime and emit the same amount of light despite degradation of the LEDs due to increased wattage/power consumption by the LEDs. The retrofit kit allows for having a body with light sources where the power consumption and color settings can be changed without replacement of the electronic components. The retrofit kit also allows for storage of less inventory (such as in a store or warehouse) because a single body can be adjusted for different power consumption and light color settings.

The retrofit light fixture can communicate with a control device to control the light sources comprising a plurality of light-emitting diodes (LEDs) with different colors. Control of the light source by the control device may be performed either in a wireless or in a wired manner. Wireless control can be with a smart phone, an App, a tablet computer, a home/building interactive device, WiFi. Bluetooth, or other wireless protocols.

The user can operate the light fixture in three modes for the color, with the first color only, the second color only, or both the first and the second color to obtain a blended third color. The colored LE) light sources can be selected from the two of: Soft White (2700K-3000K), Bright White/Cool White (3500K-4100K), and Daylight (5000K-6500K). One combination can be 3000 and 5000 Kelvin. The light fixture can be configured to allow for adjusting the power delivered to the LED light sources, such as to 20, 30, or 40 watts. The light fixture retrofit can comprise a rectangular body with LED boards having the plurality of the LEDs placed in horizontal fashion on the body.

A user can use a switch to set the light fixture to the first color, the second color, or the blend color. In addition, the retrofit light is configured to vary the total quantity of visible light emitted by a source per unit of time (Lumen) by changing the power consumption of the LEDs. Different levels of power, such as 20, 30, and 40 watts can be delivered to the light sources. The change in color and Lumens can be performed with a single switch, or two separate switches.

FIG. 1 illustrates the new body 1 of the troffer light fixture that is attached to a pre-existing housing 14. The body 1 can have one or more LED boards 9 (illustrated in FIG. 4), a transparent or translucent cover 8, and a ballast 3 on the back-side of the body. The ballast 3 as illustrated has two switches.

Figure 2:
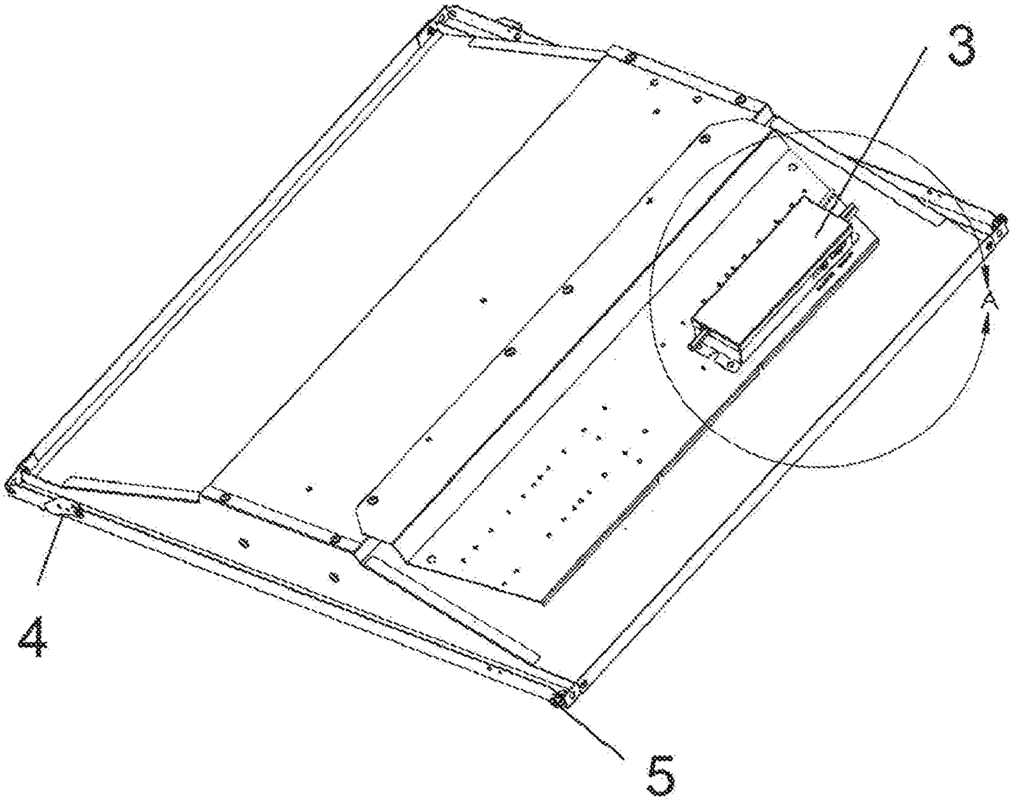
FIG. 2 illustrates the back of the body with a ballast.

FIG. 2 illustrates the top side of the body 1. Illustrated in this drawing are ballast 3, hook 4, and pivot member 5. Hook 4 and pivot member 5 are used to pivotally attach the body to bracket assembly 12, and to secure the body 1 to the bracket assembly 12.

Figure 3:
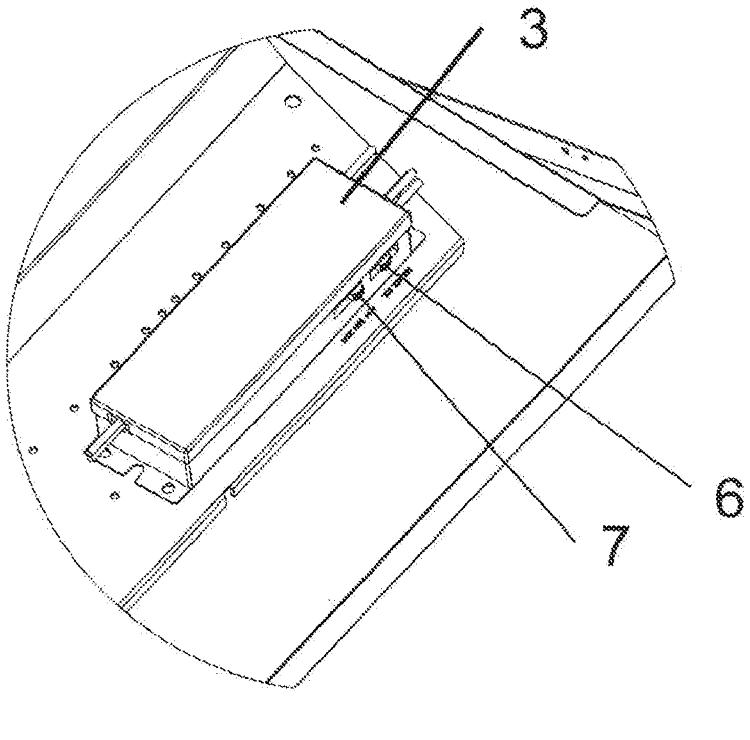
FIG. 3 illustrates the ballast of FIG. 2, where in this embodiment two separate switches are present.

FIG. 3 is an exploded view of FIG. 2, illustrating power switch 6 and color switch 7 placed on the ballast 3. Power switch 6 can be used to adjust the power (wattage) and color switch 7 can be used to adjust the color of the LEDs. As illustrated, both switches have three positions. Power switch 6 can have a switch for 20, 30 and 40 Watts. Color Switch 7 can have a position for 3000 k, 5000 k, or both colors.

Figure 4:
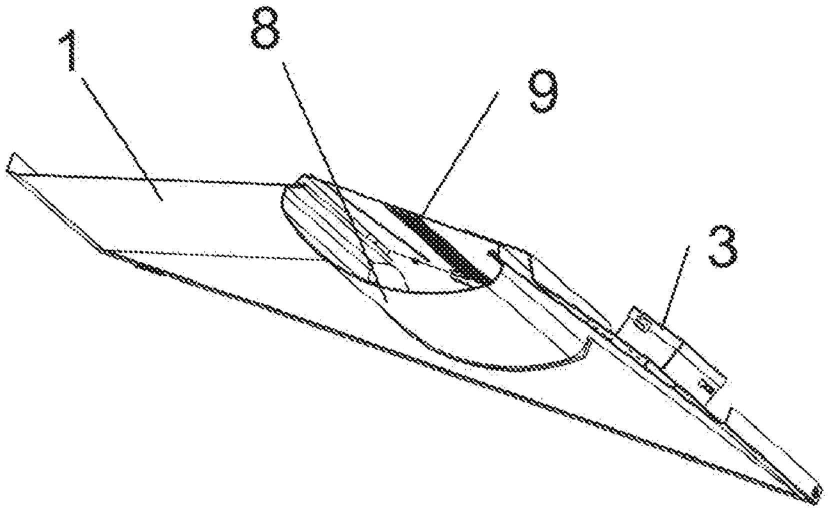
FIG. 4 illustrates the LED board and the transparent cover of the body.

FIG. 4 illustrates a cut-off view where inside of body 1 is visible. Visible in this view is LED board 9, which is placed under above transparent cover 8. Ballast 3 is placed on top of the body 1. The sides of the body 1 can have a slight decline (such as 10-30) on each side, from a center portion that is horizontal and has the LED board 9 attached onto.

Figure 5:
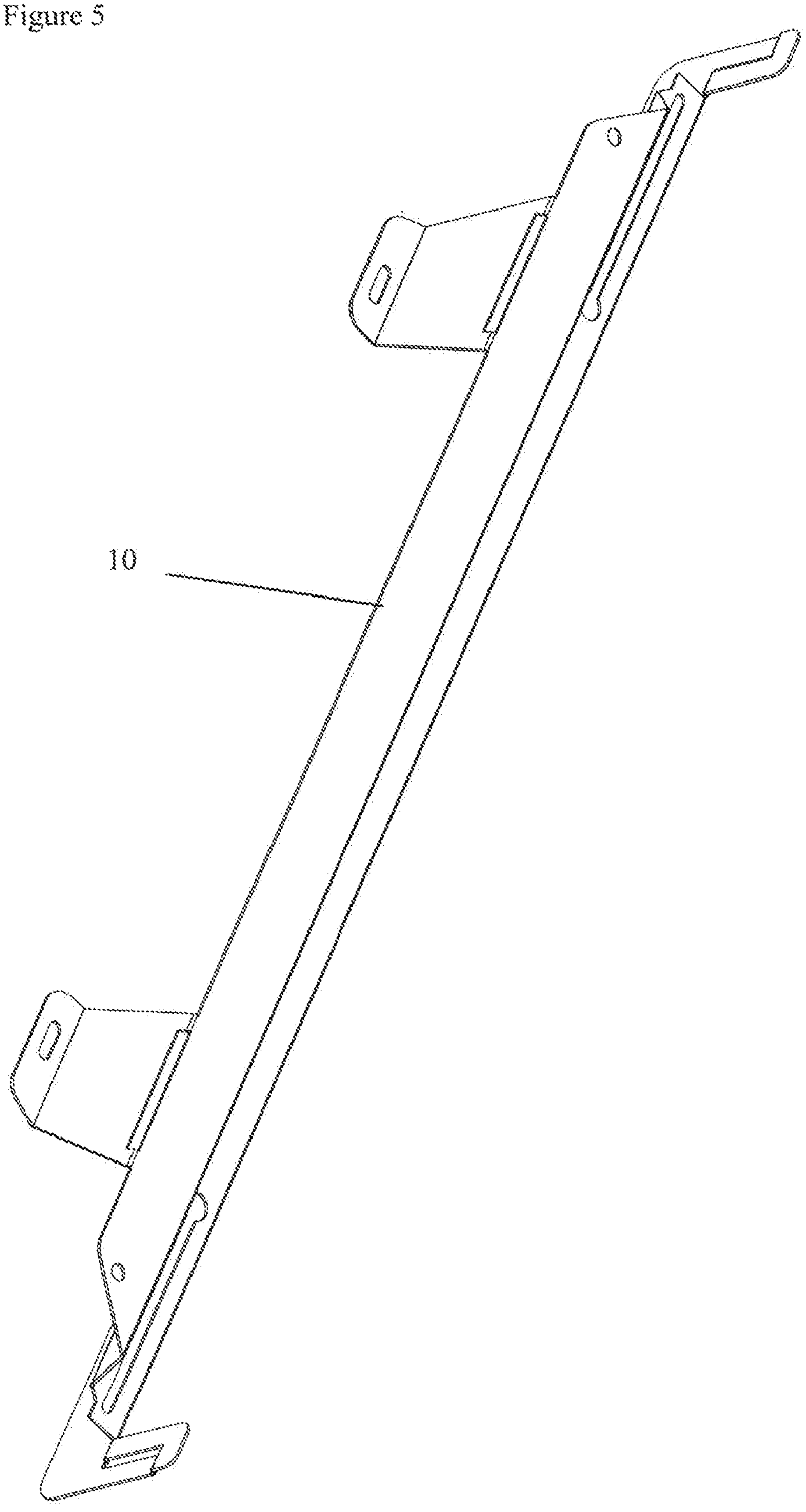
FIG. 5 illustrates a first type of a bracket with a slot.

FIG. 5 illustrates a first type of bracket 10, which has a slot and slot opening for receiving the protruding member of the body 1. The member goes through the opening, and then pivots when needed in relation to the slot. Bracket 10 also has a portion that is placed in between the pre-existing housing 14 and the T-Bar 13 to secure the bracket in place.

Figure 6:
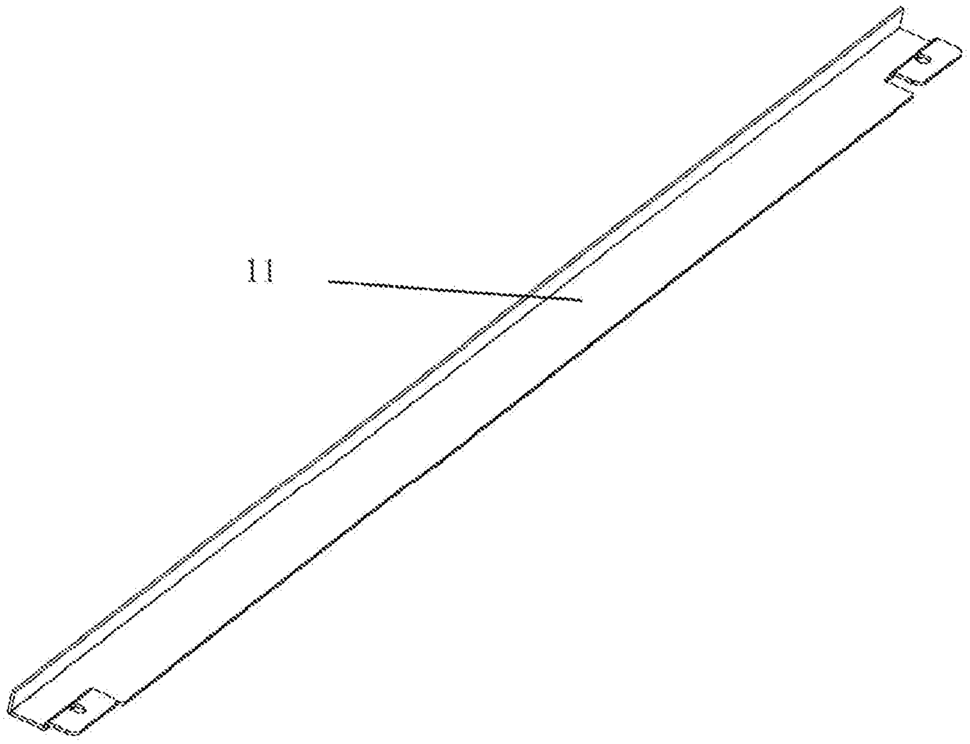
FIG. 6 illustrates a second type of a bracket with a slot.

FIG. 6 illustrates a second type of a bracket 11 which functions as a connector.

Figure 7:
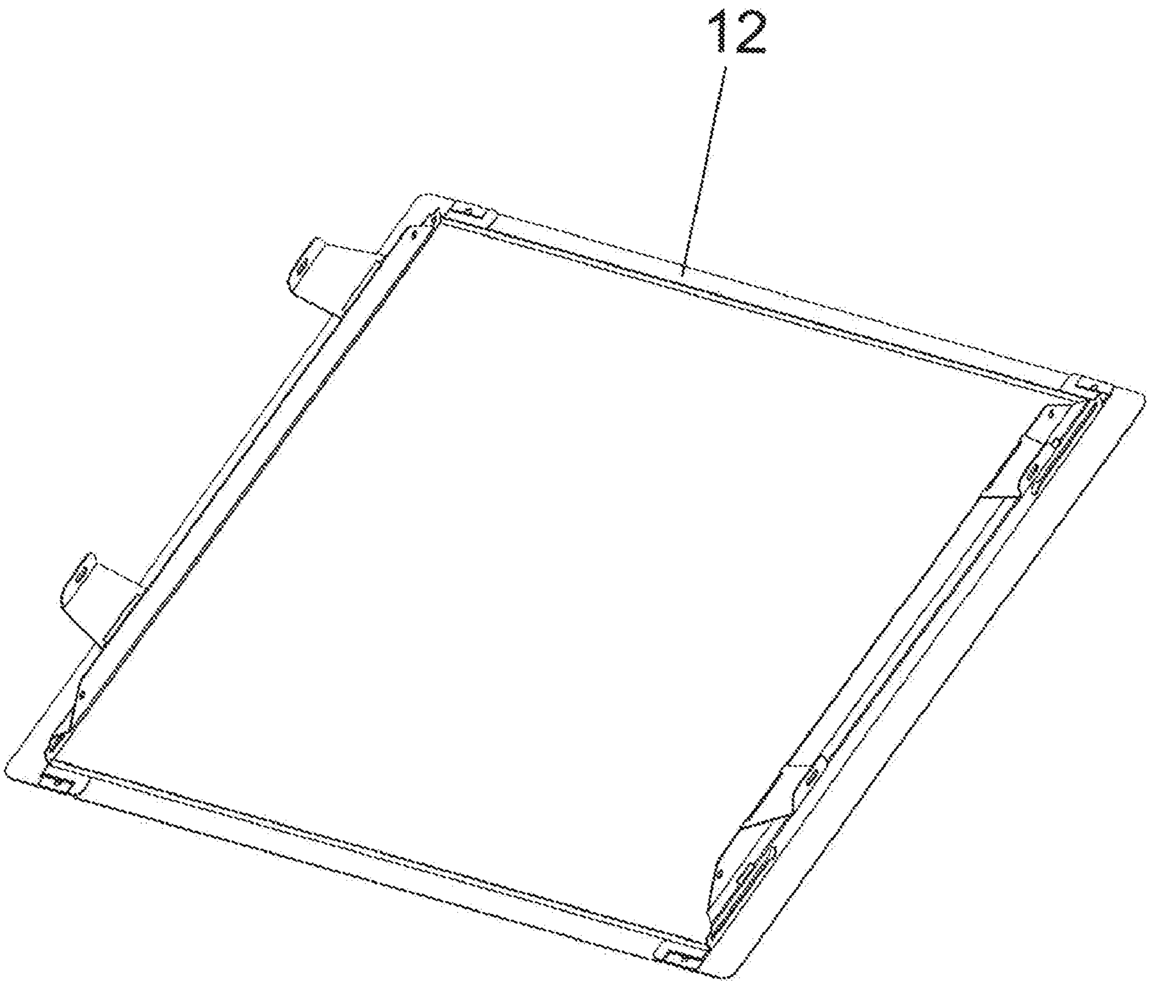
FIG. 7 illustrates the body installed above the T-bar.

FIG. 7 illustrates a bracket assembly 12 made from four separate brackets, two of the first type 10 and two of the second type 11. In other embodiments, brackets of different shapes can be used, and the bracket assembly 12 can only have three rather than four sides.

Figure 8:
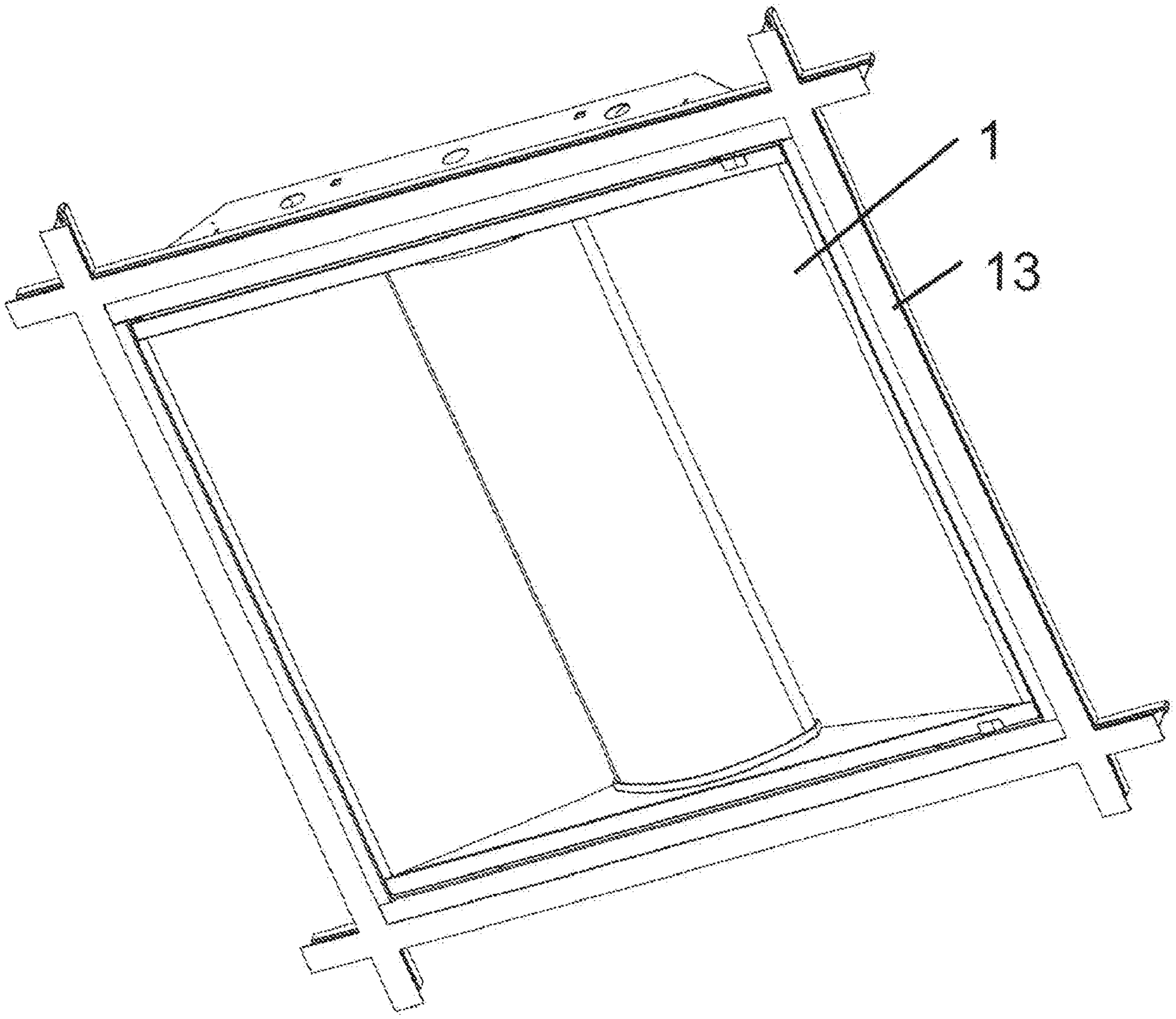
FIG. 8 illustrates a bracket assembly.

FIG. 8 illustrate views of the retrofit assembly on the T-Bar 13. The brackets are placed in between the pre-existing housing 14 and the T-bar 13, and can be fastened to the pre-existing housing.

Figure 9:
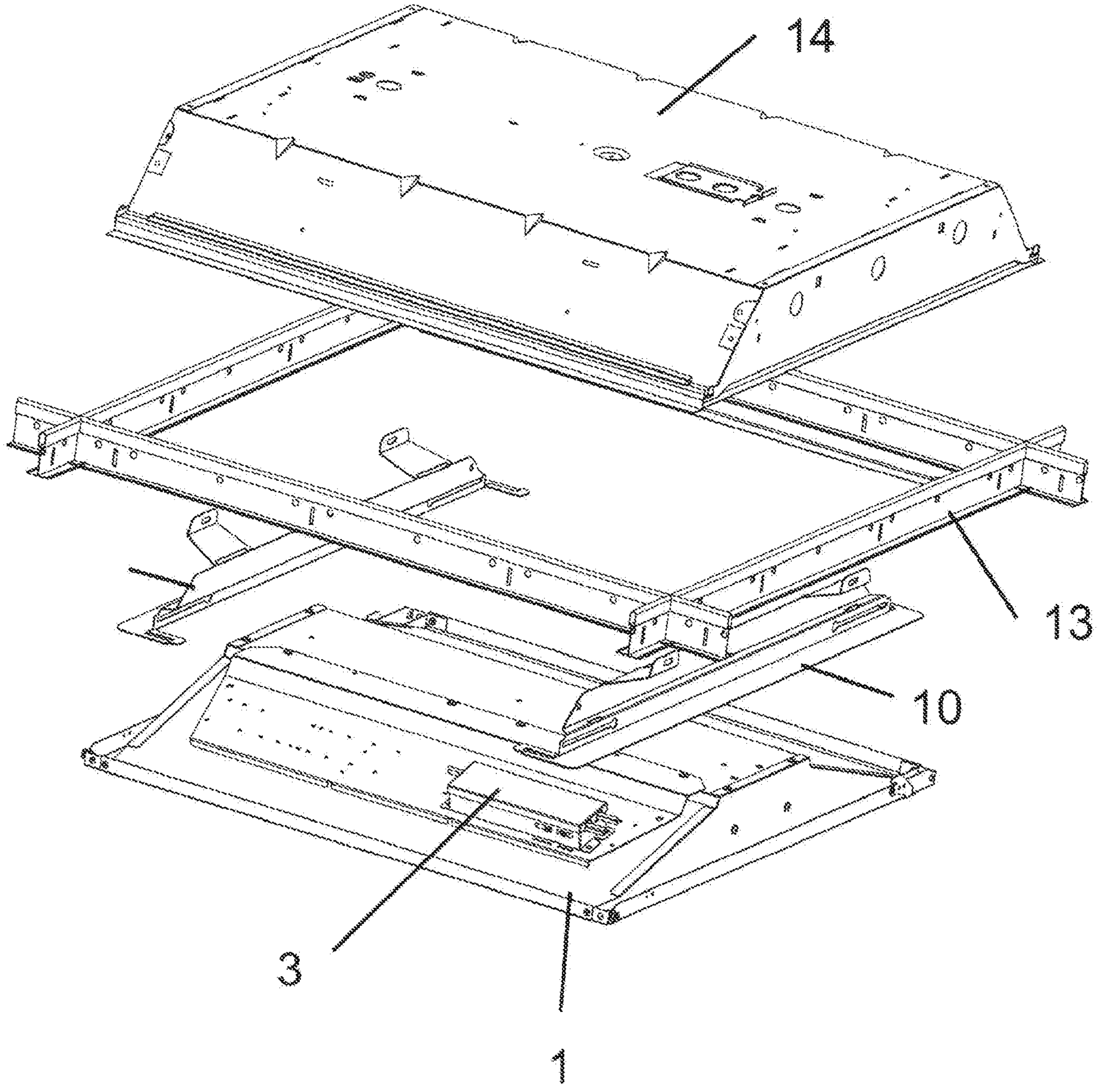
FIG. 9 illustrates an exploded view of the light fixture, showing a pre-existing housing, the T-bar, brackets, and the body of the retrofit.
Figure 10:
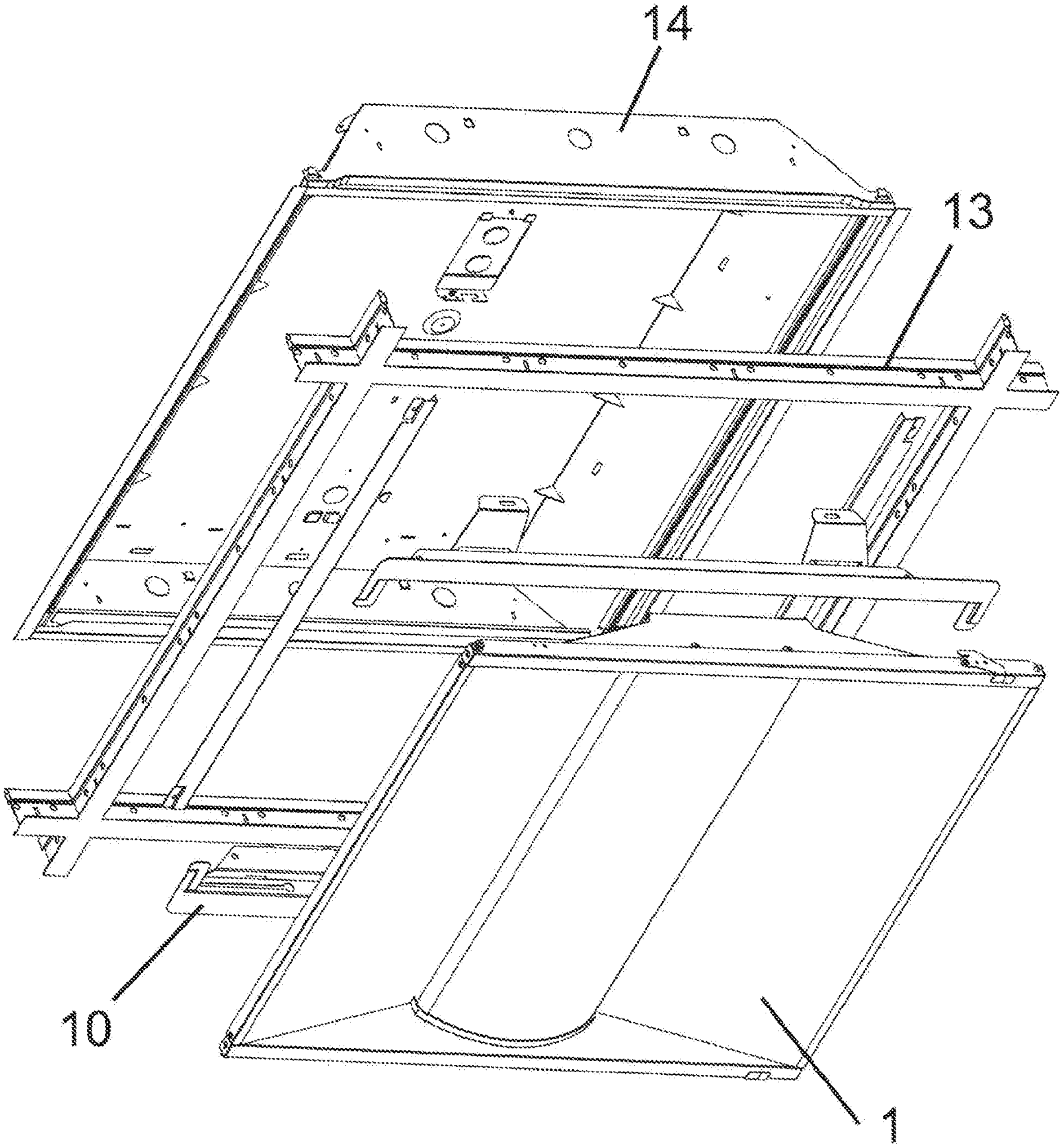
FIG. 10 illustrates an exploded view of the light fixture, showing a pre-existing housing, the T-bar, brackets, and the body of the retrofit.

FIGS. 9 and 10 illustrate an exploded view of the light fixture. Illustrated in this view are housing 14, which can be a pre-existing housing of a fluorescent light. The housing 14 rests on T-Bar 13. Bracket 10 is placed in between the housing 14 and T-bar 13. Bracket 10 is then pivotally attached to body 1.

Figure 11:
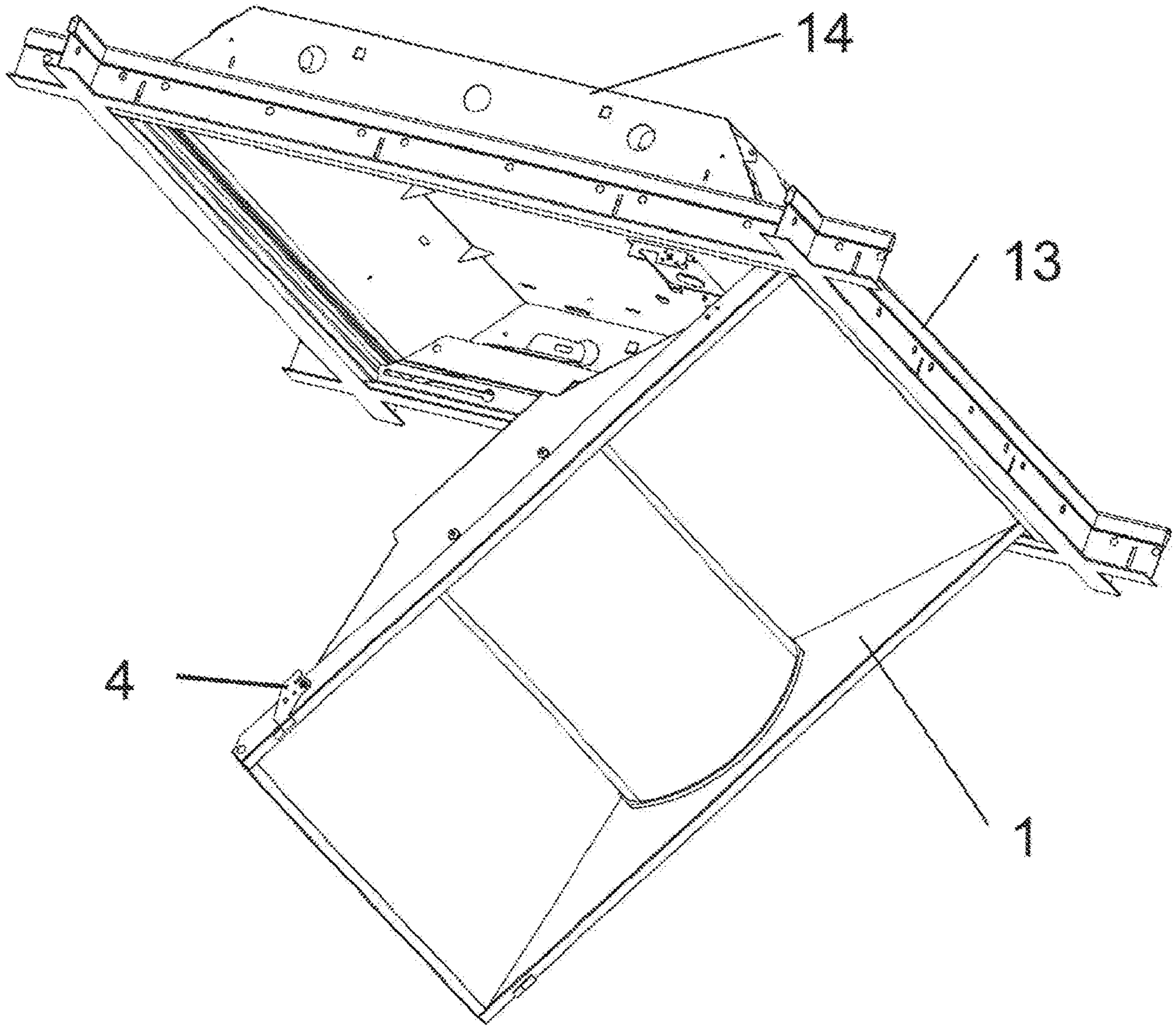
FIG. 11 illustrates the body pivoting on the bracket.
Figure 12:
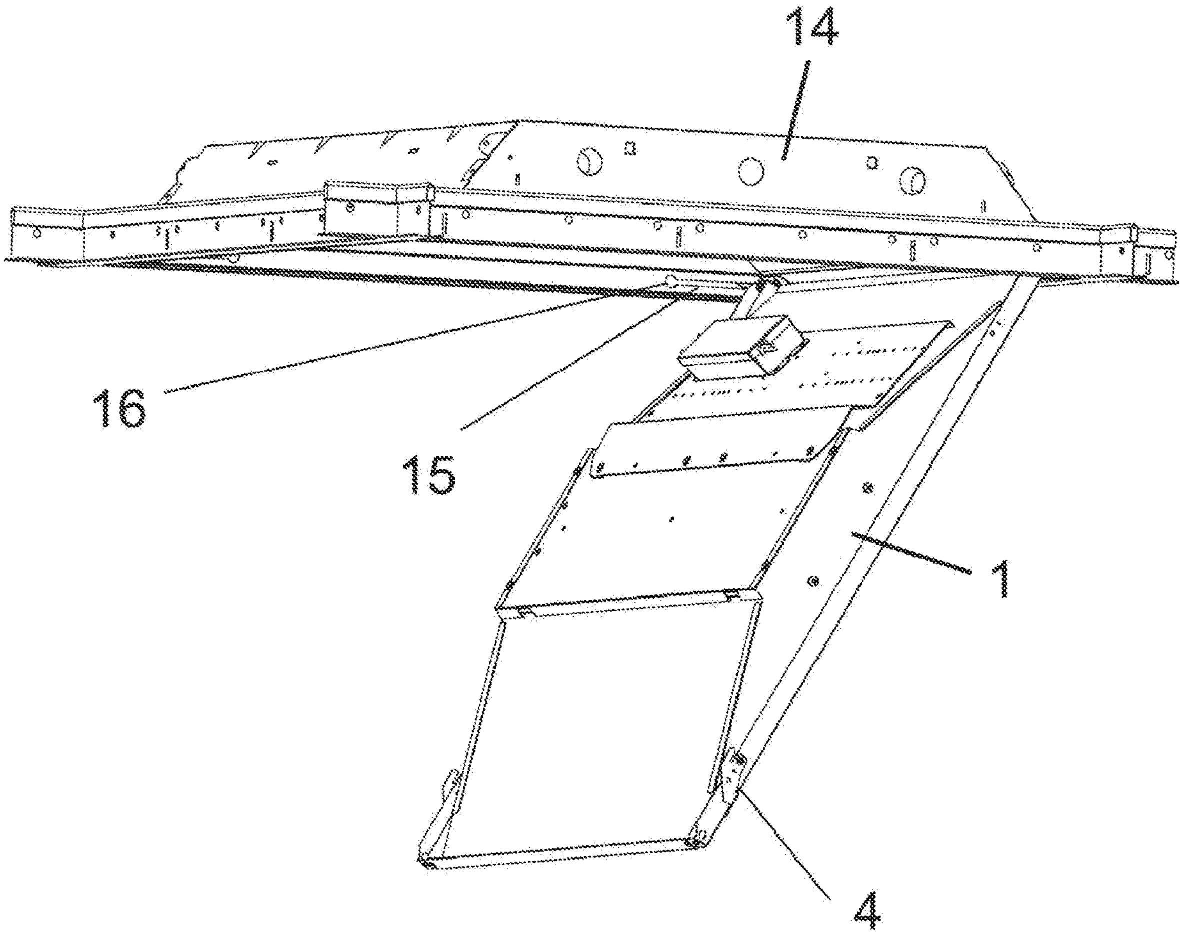
FIG. 12 illustrates the body pivoting on the bracket.

FIGS. 11 and 12 illustrate the body 1 pivoting against the bracket. The body 1 pivots through one side against a side of the bracket. The body 1 can have a pivoting member, which can be a round screw or fastener, that enters the slot 15 of the bracket through an enlarged slot entrance 16. The other side of the body can have a fastener/hook 4 that is attached to a slot or other portion of the brackets to secure the body to the T-bar 13.

Figure 13:
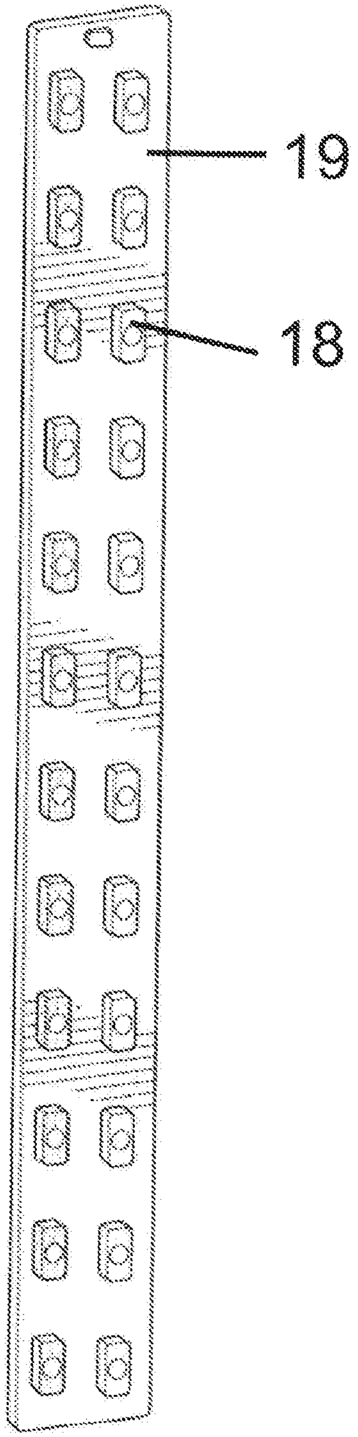
FIG. 13 illustrates placement of differently colored LED lights on a board.

FIG. 13 illustrates the LED board 19 with differently colored LED light sources 18 placed on the same LED board 19.

Figure 14:
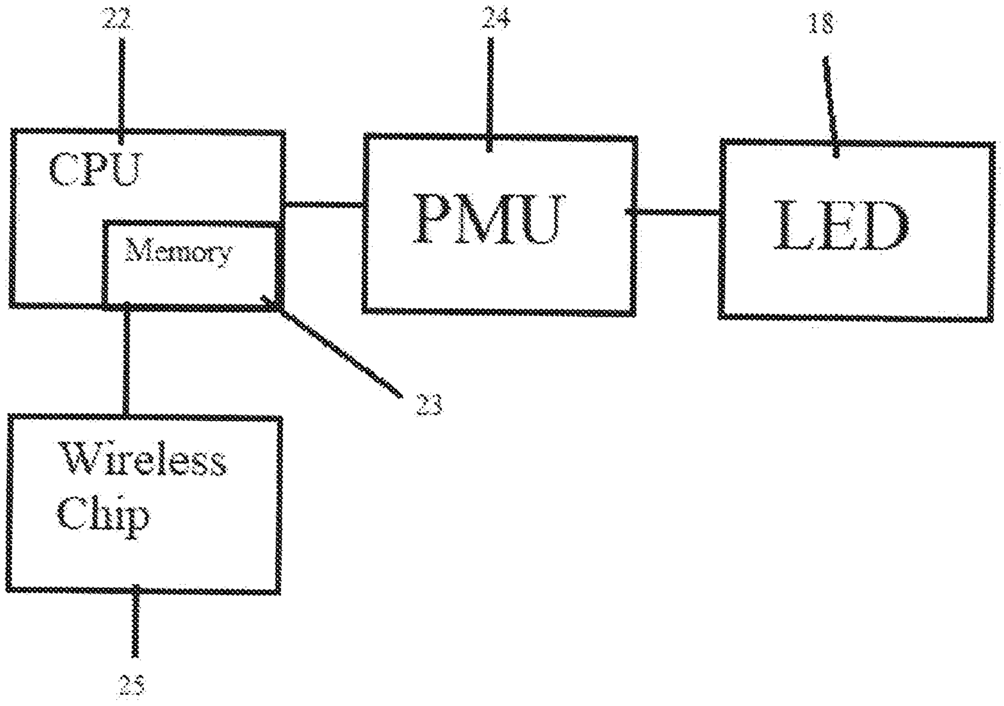
FIG. 14 illustrates a simplified summary of the some of the electronic components.

FIG. 14 illustrates a simplified summary of the some of the electronic components, such as a CPU (central Processing Unit) 22, Memory 23, PMU (Power management Unit) 24, LED (Light Emitting Diode) 18, and wireless chip 25.

The body 1 and the brackets 10, 11 can be sold as a kit in a single package, such as in a box and/or a plastic bag.

REFERENCE NUMBERS

1. Body
2. N/A
3. Ballast
4. Hook
5. Pivot Member
6. Power Switch
7. Color Switch
8. Cover
9. LED Board
10. Bracket With A Slot Opening
11. Bracket Which Functions As A Connector
12. Bracket Assembly
13. T Bar
14. Housing
15. Slot
16. Slot Entrance

17. N/A
18. N/A
19. N/A
20. CPU
21. Memory
22. PMU
23. Wireless chip (WiFi or Bluetooth)

What is claimed is:

1. A light fixture retrofit kit comprising:

a) a body with a protruding member and a hook;

b) an LED board placed on the body;

c) LED light sources placed on the LED board, the LED light sources comprising a first light source with a first color and a second light source with a second color;

d) a first switch on a ballast that is attached to the body for controlling which LED color to power;

e) a second switch on the ballast that is attached to the body for controlling the wattage of the LED light sources;

f) a transparent or translucent cover below the LED board;

g) a bracket with a slot for receiving the protruding member for attaching the body to a pre-existing housing resting on a T-bar;

wherein the fixture is placed inside of the pre-existing housing and pivotally attached to the T-bar with the bracket;

wherein the first light source with the first color has a color selected from (2700 k-3000 k), (3500 k to 4100 K), and (5000 k to 6500 K) and the second light source with the second color has a color selected from (2700 k-3000 k), (3500 k to 4100K), and (5000 k to 6500K), wherein the first color and the second color are different colors; and wherein the user selects to power the first light source only, the second light source only, or both the first and the second light source to produce a blended color that is different than the first and the second color.

* * * * *